Patented July 10, 1934

1,966,125

UNITED STATES PATENT OFFICE 1,966,125

PRODUCTION OF AMINO-ACYLAMINO-ANTHRAQUINONES

Karl Koeberle, Ludwigshafen-on-the-Rhine, Germany, assignor to General Aniline Works, Inc., New York, N. Y., a corporation of Delaware No Drawing. Application November 3, 1932, Serial No. 641,121. In Germany November 7, 1931

23 Claims. (Cl. 260—60)

The present invention relates to new sulphamino-carboxylamino-anthraquinones and amino-carboxylamino-anthraquinones and a process of producing same.

It has already been proposed to prepare amino-acylamino-anthraquinones by the partial acylation of polyamino-anthraquinones or by acylation and reduction of amino-nitroanthraquinones but on the one hand the initial materials for the last-mentioned process are only obtainable with difficulty commercially and on the other hand the yields in amino-acylamino-anthraquinones obtained by the partial acylation for example of diamino-anthraquinones leave much to be desired because the initial material is partly acylated in all of the amino groups and partly unattacked.

I have now found that amino-acylamino-anthraquinones which are very valuable as intermediates for the preparation of dyestuffs and in part as dyestuffs themselves are obtained in a technically simple manner by treating sulphamino-carboxylamino-anthraquinones under mild conditions with acid agents having a saponifying action. Mild conditions are those by which only the groups which are less strongly combined, namely the sulphamino groups, are saponified but not the groups which are more strongly combined, namely the carboxylamino groups. These conditions may be obtained by the correct choice of the saponification temperature, the acid concentration and the nature of the acid employed. Suitable saponifying agents are sulphuric acid, fuming sulphuric acid, methyl sulphuric acid and chlorosulphonic acid. Sulphuric acid may be employed in the form of monohydrate or in a concentration of 96 or 100 per cent, but usually also more dilute acids may be used, for example acids with from 60 to 70 per cent strength. The reaction may be represented by the following equation:

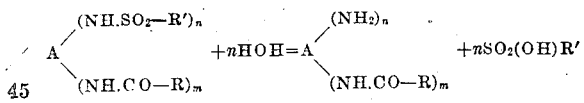

wherein A means an anthraquinone radicle, R' an aromatic radicle, R hydrogen or an organic radicle, $n$ and $m$ whole numbers. At least one of the radicles A or R preferably bears a substituent selected from the class consisting of the halogens, namely chlorine, bromine, iodine and fluorine, the nitro, hydroxyl, mercapto and alkoxyl groups and those substituents which can be linked to A or R by means of a C—C-linkage. For example R' may be the radicle of benzene, ortho- or para-toluene, naphthalene or anthraquinone. R may be hydrogen or alkyl, such as methyl, ethyl, propyl etc. and the oxalyl radicle or an aromatic radicle such as phenyl. Substituents which may be connected to A or R by means of a C—C-linkage are for example the alkyl, the cycloalkyl, the acyl and the aroyl radicles and the carboxylic acid group and its functional derivatives such as esterified carboxyl acid groups, the aldehyde group, the thiocyano group and the cyano group. Valuable compounds are obtained according to the present invention by starting with materials in which R is a heterocyclic radicle; for example mononuclear heterocyclic radicles such as the pyridine radicle or polynuclear radicles such as the radicles of quinoline, thioxanthone, pyrazolanthrone, anthraquinoneacridone, selenoazoleanthrone and anthrapyrimidone are very suitable. Preferably the partial saponification of the sulphamino-acylamino compounds is carried out with concentrated sulphuric acid, if necessary with an addition of ice or water, at low temperatures of from about 20° to 30° C. In many cases, however, higher or lower temperatures may be necessary and suitable for carrying out the partial saponification, the range of temperatures which may be employed being from about 0° to about 90° C. The process is capable of general employment for the preparation of mono-amino-mono-acyl-amino-anthraquinones or mono-amino-polyacylamino-anthraquinones and also for the preparation of polyamino-monoacylamino-anthraquinones and polyamino-polyacylamino-anthraquinones. The process offers the advantage that the initial materials are readily accessible and that the desired final products are obtained in a theoretical yield.

I have further found that the preparation of the sulphamino-carboxylamino compounds may be carried out by the condensation of halogen carboxylamino-anthraquinones with sulphamides or of halogen sulphamino-anthraquinones with carboxylic acid amides or by the acylation of amino-sulphamino-anthraquinones. In many cases the preparation of the halogen carboxylamino compounds, their condensation with the sulphamides or the acylation of the amino-sulphamino compounds may be carried out in one operation with the saponification of the resulting sulphamino-carboxylamino-anthraquinones to form the corresponding amino-carboxylamino-anthraquinones.

In addition to the amino-acylamino-anthraquinones already known, as for example 1.4- and 1.5-amino-benzoylamino-anthraquinones, a series of new valuable compounds of the said kind may be prepared in a simple manner according to this invention, as for example 1.4- and 1.5-amino-acylamino-anthraquinones in which the acyl groups, as for example the acetyl or benzoyl groups, are substituted by halogen, nitro-alkyl or alkoxy groups, phenyl, aralkyl, cyano or other radicles, and also the hitherto unknown 1-amino-8-acylamino-anthraquinones and alpha.beta- and beta.beta-amino-acylamino-anthraquinones.

The reaction products, usually obtained in very good yields and very good state of purity, may be purified if desired by the usual methods, preferably in the same operation as their preparation. The purification may be carried out immediately after the partial saponification, for example by separating the reaction products in the form of their sulphates.

The following examples will further illustrate the nature of this invention but the invention is not restricted to these examples. The parts are by weight.

Example 1

30 parts of sodium acetate, 36 parts of para-toluene-sulphamide and 5 parts of cupric acetate are added to 40 parts of 1-chloro-4-para-chlorobenzoylamino-anthraquinone (obtainable by treating α-amino-anthraquinone with para-chlorobenzoyl chloride and chlorinating the reaction product with sulphuryl chloride). The mixture is heated for some hours at 140° to 145° C. After the reaction is substantially completed the mixture is further heated for 2 to 3 hours to boiling. The 1-para-toluene-sulphamino-4-para-chlorobenzoylamino-anthraquinone precipitated in crystalline form is filtered off by suction. It is washed with water or diluted acids and dried.

400 parts of the material thus obtained are dissolved at from 20° to 30° C. in 4000 parts of concentrated sulphuric acid and stirred for a short time at 25° C. As soon as a sample withdrawn and poured into cold water yields a violet blue flocculent precipitate, the whole is poured into water, filtered by suction, washed until neutral and dried. The 1-amino-4-para-chlorbenzoylamino-anthraquinone thus obtained in a quantitative yield is a violet blue powder which crystallizes in the form of violet needles and dissolves in concentrated sulphuric acid giving a wine red coloration. By adding formaldehyde, the solution becomes green but red when held up to the light. The vat solution is brown red and the color on cotton is violet.

In an analogous manner, 1-amino-4(meta-methoxy)benzoylamino-anthraquinone is obtained from 1-para-toluenesulphamino-4-(meta-methoxy)benzoylamino-anthraquinone and 1-amino-4-(2.5-dichlor)benzoylamino- or 1-amino-4-benzoylamino-anthraquinone from 1-para-toluenesulphamino-4-(2.5-dichlor)benzoylamino- or 1-para-toluenesulphamino-4-benzoylamino-anthraquinone.

In addition to the said acyl compounds, the following are also suitable for the reaction: the acylation products of 1-para-toluenesulphamino-4-amino-anthraquinone with toluic acids, nitrobenzoic acids, diphenyl carboxylic acids, terephthalic acid, naphthalene carboxylic acids, benzophenone carboxylic acids, anthraquinone and anthracene carboxylic acids, acetic acid, oxalic acid, brombenzoic acids, cyanobenzoic acids and benzanthrone carboxylic acids. Instead of 1-para-toluenesulphamino-4-acylamino-anthraquinone, the substitution products thereof may be subjected to partial saponification.

1-amino-4-acylamino-anthraquinones may be prepared in an analogous manner from the corresponding 1-para-toluenesulphamino-4-acylamino-anthraquinones in which the acyl is the radicle of the following acids: acridone-Bz-carboxylic acids, thioxanthone carboxylic acids such as thioxanthone-Bz3-, Bz4- or Bz5-carboxylic acid, pyridine carboxylic acids, anthrapyrimidone carboxylic acids, anthrapyridone carboxylic acids, pyrazolanthrone carboxylic acids, thiazolanthrone carboxylic acids, selenoazolanthrone carboxylic acids and diphenylsulphide carboxylic acids.

Example 2

200 parts of 1-chloro-5-(2.5-dichloro)benzoylamino-anthraquinone (obtainable by treating 1-amino-5-chloro-anthraquinone with 2.5-dichloro-benzoylchloride) are heated while stirring at 140° to 150° C. in 1000 parts of nitrobenzene together with 100 parts of potassium carbonate, 400 parts of para-toluenesulphamide and 25 parts of cupric acetate. This temperature is maintained until the development of carbon dioxide has ceased practically. Then the mixture is heated for a short time at 170° to 175° C. After the development of carbon dioxide has ceased entirely the reaction mixture is allowed to cool and worked up in the usual manner. The reaction product, 1-para-toluenesulphamino-5-(2.5-dichloro)benzoylamino-anthraquinone, is a yellow crystalline powder.

The treatment of 1-chloro-5-amino-anthraquinone with 2.5-dichlorobenzoylchloride and the condensation of the 1-chloro-2.5-dichlorobenzoyl-amino-anthraquinone with para-toluenesulphamide may be carried out without isolating the intermediate product, namely the chloro-acylamide.

400 parts of 1-para-toluenesulphamino-5-(2.5-dichlorbenzoyl)-aminoanthraquinone thus obtained are dissolved in 3000 parts of 94 per cent sulphuric acid at from 20° to 25° C. and stirred at this temperature until a sample withdrawn and poured into water separates in the form of orange red flocks. The whole is then poured into water, filtered by suction, washed until neutral and dried. The yield is quantitative. The resulting 1-amino-5-(2.5-dichloro-benzoyl)-aminoanthraquinone is an orange powder which crystallizes in the form of needles, dissolves in concentrated sulphuric acid giving a yellow-olive coloration and dyes cotton yellow shades from an orange vat.

In a corresponding manner, 1-amino-5-benzoylamino-anthraquinone having a melting point of from 258° to 260° C. may be prepared from 1-para-toluenesulphamino-5-benzoylamino-anthraquinone. 1-para-toluenesulphamino-5-benzoyl-amino-anthraquinone may be obtained for example by reacting 1 molecular proportion of 1.5-dichloro-anthraquinone with 1 molecular proportion of para-toluenesulphamide, splitting off the para-toluenesulphonic acid radicle, benzoylating the amino group and condensing the resulting 1-chlor-5-benzoylamino-anthraquinone with para-toluenesulphamide.

Other 1-amino-5-acylamino-anthraquinones, as for example 1-amino-5-acetylamino- or 1-amino-5-beta-naphthoylamino-anthraquinones, or substituted 1-amino-5-acylamino-anthraquinones, as for example 1-amino-5-benzoylamino-8-methoxy- (having a melting point of from 234° to 236° C.) or 1-amino-5-benzoyl-amino-8-hydroxy-anthraquinones may be prepared in an analogous manner.

Example 3

256 parts of 1-amino - beta - chloro - anthraquinone are heated with 160 parts of benzoyl-chloride in 1000 parts of nitro-benzene for a short period at 180° C. Then the mixture is allowed to cool down to 130° to 140° C. and 200 parts of potassium carbonate, 25 parts of cupric acetate and 360 parts of para-toluenesulphamide are added and the mixture obtained is heated while stirring at 140° to 150° C. until the strong development of carbon dioxide diminishes. Then the temperature is raised up to 180° to 200° C. until carbon dioxide is no longer developed. The reaction mixture is allowed to cool and 1-benzoyl-amino-8-para - toluenesulphamino - anthraquinone, obtained in the form of yellow crystals is isolated in the usual manner.

250 parts of 1-para-toluenesulphamino-8-benzoylamino-anthraquinone thus obtained are dissolved in 2000 parts of 96 per cent sulphuric acid at from 20° to 25° C. and stirred until a sample withdrawn and poured into water yields an orange red flocculent precipitate. The whole is then worked up in the usual manner. The resulting 1-amino-8-benzoylamino-anthraquinone is an orange powder which crystallizes in the form of needles, dissolves in sulphuric acid giving a green yellow coloration and dyes cotton salmon shades from a brown red vat. If 1-para-toluene-sulphamino-8-acylamino-anthraquinones other than the initial material be employed, the corresponding 1-amino-8-acylamino-anthraquinones are obtained in an analogous manner.

Example 4

100 parts of 2-para-toluenesulphamino-3-benzoylamino-anthraquinone (obtainable from 2-bromo-3-benzoylamino-anthraquinone by condensation with para-toluenesulphamide) are stirred in 1000 parts of 95 per cent sulphuric acid at from 20° to 25° C. for some hours and then worked up in the usual manner. The resulting 2 - amino - 3 - benzoylaminoanthraquinone is an orange red powder which crystallizes in the form of small needles, dissolves in concentrated sulphuric acid giving a yellow coloration and yields a dark brown vat.

1-amino-2-benzoylamino-anthraquinone is obtained in a corresponding manner from 1-para-toluenesulphamino - 2 - benzoyl - amino-anthraquinone, and 1-benzoylamino-2-amino-anthraquinone from 1-benzoylamino-2-para-toluene-sulphamino-anthraquinone.

Example 5

360 parts of 1-chloro-5-benzoylamino-anthraquinone, 1200 parts of nitrobenzene, 400 parts of ortho-toluenesulphamide, 400 parts of sodium acetate and 50 parts of cupric acetate are heated for some hours at 145° to 150° C. and then heated for some hours to boiling whereby the reaction is completed 1-ortho-toluenesulphamino - 5 - benzoylamino-anthraquinone is obtained in the form of a yellow crystalline powder from the reaction mixture by working up in the usual manner.

100 parts of the product thus obtained are dissolved in 500 parts of monohydrate and, after the addition of 30 parts of ice, stirred at from 10° to 20° C. until a sample withdrawn and poured into water is precipitated in the form of orange flocks. The whole is then worked up in the usual manner. The reaction product obtained is pure 1-amino-5-benzoylamino-anthraquinone having the properties given in the literature.

Example 6

365 parts of 1-chloro-5-benzoylamino-anthraquinone are heated in 1000 parts of nitrobenzene together with 300 parts of sodium acetate, 30 parts of cupric acetate and 400 parts of benzenesulphamide for some hours while stirring at 140° to 150° C. and then for some hours to boiling whereby the reaction is completed. 1-benzenesulphamino - 5 - benzoylamino - anthraquinone is precipitated in the form of yellow crystals. It is isolated in the usual manner.

100 parts of 1-benzenesulphamino-5-benzoyl-amino-anthraquinone thus obtained are dissolved in 1000 parts of 90 per cent sulphuric acid at from 20° to 30° C. The temperature is then raised to from 40° to 50° C. and the whole kept at this temperature until a sample withdrawn and poured into ice-cold water is deposited as an orange flocculent precipitate, the whole then being worked up in the usual manner. The reaction product obtained agrees with that obtained according to Example 5.

Naphthalene - alpha - sulphamino - 5 - benzoylamino-anthraquinone or 1(anthraquinone-beta-sulphamino) - 5 - benzoylamino - anthraquinone may be employed as initial material instead of benzenesulphamino-5-benzoylamino-anthraquinone.

Example 7

100 parts of the acylamine derived from 1-chloro-5-amino-anthraquinone and salicyclic acid are converted by reaction with para-toluene-sulphamide in the usual manner into 1-para-toluenesulphamino - 5 - ortho - hydroxybenzoylamino- anthraquinone.

19 parts of this product are dissolved in 95 per cent sulphuric acid at from 30° to 35° C., stirred for several hours while cold, precipitated in water, filtered by suction, washed until neutral and dried. The 1 - amino-5-ortho-hydroxybenzoylamino-anthraquinone obtained in a quantitative yield is an orange red powder which yields a brown vat and dissolves in concentrated sulphuric acid giving a yellow coloration.

Other hydroxy-acylamino-amino-anthraquinones may be prepared in an analogous manner for example 5-amino-1.4-di(ortho-hydroxylbenzoylamino)-anthraquinone may be obtained from 1.4 - di - (ortho - hydroxybenzoyl - amino) - 5 - para-toluenesulphamino-anthraquinone (obtainable from 1.4-diamino-5-chloro-anthraquinone by treatment with salicyclic acid chloride and condensation with para-toluenesulphamide).

Example 8

20 parts of 5-para-toluenesulphamino-1.4-di-meta - methoxybenzoylamino) - anthraquinone (obtainable in an analogous manner to that described in the first paragraph of the preceding example) are dissolved at room temperature in 100 parts of 96 per cent sulphuric acid, precipitated in ice-cold water, filtered by suction, washed until neutral and dried. The resulting 5-amino-1.4 - di - (meta-methoxy-benzoylamino)-anthraquinone is a violet powder which dissolves in concentrated sulphuric acid giving a yellow coloration and melts at 240° C.

Example 9

100 parts of the para-toluenesulphamino compound obtained by condensing tetrachloro-1.8- di(benzoylamino)-anthraquinone with para-toluenesulphamide are dissolved at room temperature in 1000 parts of 95 per cent sulphuric acid. As soon as a sample withdrawn and poured into ice-cold water yields a violet brown precipitate, the solution is poured into water, filtered by suction and dried. The resulting amino-di(benzoylamino) compound is a brown powder which dissolves in concentrated sulphuric acid giving a yellow coloration and yields a brown vat.

Example 10

100 parts of 1-chloro-5-para-toluenesulphamino-anthraquinone (obtainable by condensing 1.5-dichloroanthraquinone with 1 molecular proportion of para-toluenesulphamide), 100 parts of calcined sodium carbonate, 10 parts of cupric carbonate and 150 parts of benzamide are heated in 500 parts of naphthalene for 6 hours to boiling. After the reaction is completed the mixture is allowed to cool and worked up in the usual manner whereby 1-para-toluenesulphamino-5-benzoylamino-anthraquinone is obtained.

The same product may be obtained also by condensing 1-chloro-5-amino-anthraquinone with para-toluenesulphamide and subsequently benzoylating the 5-amino-1-para-toluenesulphamino-anthraquinone thus obtained. 100 parts of 1-toluenesulphamino-5-benzoyl-amino-anthraquinone obtained according to one of the aforesaid methods are dissolved in 1000 parts of chlorosulphonic acid at 20° to 30° C. This temperature is maintained until a sample yields an orange colored precipitate when poured onto ice-water and the product thus obtained has a melting point of 245° to 250° C. after isolation and drying. Then, the solution is poured into ice-water and the precipitate formed is filtered off by suction, washed until neutral and dried. The 1-amino-5-benzoyl-amino-anthraquinone thus obtained is identical with that obtained according to Example 5.

Instead of chlorosulphonic acid monohydrate or fuming sulphuric acid or methylsulphuric acid or a mixture of some of these materials, for example a mixture of fuming sulphuric acid and chlorosulphonic acid may be obtained for splitting off the toluene-sulphonic acid radicle.

In an analogous manner 1-amino-4-para-nitrobenzoylamino-anthraquinone may be obtained from 1 - para - toluenesulphamino-4-para-nitrobenzoylamino-anthraquinone, 1-amino-8-para-fluorobenzoylamino-anthraquinone from 1-para-toluenesulphamino - 8-para-fluorobenzoylamino-anthraquinone, 1 - amino - 5 - benzoylamino - 8 - methoxy-anthraquinone from 1-para-toluenesulphamino - 5 - benzoyl - amino-8-methoxy-anthraquinone, 1-amino-5-benzoylamino-8-oxyanthraquinone from 1-para-toluenesulphamino-5-benzoylamino - 8 - oxy - anthraquinone, 1-para-bromobenzoylamino-3-aminoanthraquinone from 1-para - bromobenzoylamino - 3 - para-toluenesulphamino-anthraquinone, 1-para-cyanobenzoylamino-3-amino-anthraquinone from 1-para-cyano-benzoylamino-3-para-toluenesulphamino-anthraquinone and 1-para-thio-cyanobenzoylamino-3-amino-anthraquinone from 1-para-thio-cyanobenzoylamino - 3 - para-toluenesulphamino-anthraquinone.

Example 11

100 parts of 1-chloro-4-formylamino-anthraquinone, 100 parts of sodium acetate, 10 parts of cupric acetate, 130 parts of para-toluenesulphamide and 400 parts of nitrobenzene are heated for some hours while stirring at 140° to 150° C. and then heated to boiling for some hours until the reaction is completed. Then the reaction mixture is allowed to cool and 1-para-toluenesulphamino-4-formylamino-anthraquinone precipitated in crystalline form is filtered off by suction. 10 parts of this product are dissolved in 100 parts of concentrated sulphuric acid at 20° to 30° C. This temperature is maintained for a short time and the mixture is poured into ice-water. The precipitate formed is filtered off by suction, washed until neutral and dried. 1-amino-4-formylamino-anthraquinone thus obtained is a violet powder dissolving in concentrated sulphuric acid giving an orange coloration.

In an analogous manner 1-amino-4-cinnamoyl-amino-anthraquinone may be obtained from 1-chloro-4-cinnamoyl-amino-anthraquinone and 1-amino - 4' - diphenyl - carbamino-anthraquinone from 1 - chloro - 4'-diphenylcarbamino-anthraquinone.

Example 12

100 parts of 1-chloro-4-amino-anthraquinone are suspended in nitrobenzene and converted into 1 - chloro-4-acetylamino - anthraquinone in the usual manner by means of acetic anhydride. 30 parts of the product thus obtained are heated with 100 parts of nitrobenzene, 300 parts of sodium acetate, 3 parts of cupric acetate and 30 parts of para-toluenesulphamide at 150° to 160° C. while stirring. The reaction is completed by heating the mixture to boiling for a short period. After the reaction mixture has been allowed to cool 1 - para-toluenesulphamino-4-acetylamino-anthraquinone is isolated in the usual manner. 1 part of the product is dissolved in 10 parts of concentrated sulphuric acid, the temperature of the solution is kept at 20° to 30° C. for some hours. The solution is then poured into ice-water and the precipitate is filtered off by suction, washed until neutral and dried. 1-amino-4-acetylamino-anthraquinone thus obtained is a violet powder dissolving in concentrated sulphuric acid giving an orange coloration.

In an analogous manner 1-amino-4-propionyl-amino-anthraquinone may be obtained from 1-chloro-4-propionylamino-anthraquinone; if instead of the propionyl radicle other acyl radicles are present in the initial material instead of the propionyl radicle the conversion can be carried out in a similar manner. For example from the reaction product of one molecular proportion of oxalylchloride and 2 molecular proportions of 1-chloro-4-amino-anthraquinone by subsequent condensation with paratoluenesulphamide and partial saponification of the condensation product thus obtained by means of concentrated sulphuric acid at 20° to 30° C. 4.4'-diamino-1.1'-oxamino-anthraquinone may be obtained.

Example 13

250 parts of 1-chloro-5-amino-anthraquinone, 2000 parts of nitrobenzene, 250 parts of the hydrochloride of quinoline-6-carboxylic acid chloride are heated while stirring at 180° to 200° C. until the development of hydrogen chloride has ceased. Then the reaction mixture is allowed to cool and the acylamine thus formed is isolated in the usual manner. 200 parts thereof are heated with 1000 parts of nitrobenzene, 200 parts of potassium acetate, 20 parts of cupric oxide and 250 parts of para-toluenesulphamide for some hours at 140° to 160° C. and then for some hours to boiling. After the reaction is completed the mixture is allowed to cool and 1-para-toluenesulphamino-5(quinoline-6'-carbamino)-anthraquinone is isolated in the usual manner. In order to split off the toluenesulphonic acid group 10 parts of the said product are dissolved in 100 parts of 90 per cent sulphuric acid, the solution is kept for some hours at 30° to 40° C. and then poured into water. The reaction product thus precipitated is filtered off by suction, washed until neutral and dried. It is 1-amino-5(quinoline-6'-carbamino)-anthraquinone forming a yellow orange powder which dissolves in concentrated sulphuric acid giving an orange coloration.

By acting on 1-chloro-5-amino-anthraquinone with the chlorides of anthraquinone-thioxanthone-5'-carboxylic acid or anthraquinone benzacridone-5'-carboxylic acid or pyrazolanthrone-2-carboxylic acid or seleno-azole-anthrone-2-carboxylic acid or anthrapyrimidone-4-carboxylic acid, subsequent condensation of the products thus obtained with para-toluenesulphamide and partial saponification of the condensation products the corresponding 1-amino-5-aroylamino-anthraquinones are obtained.

By starting with anthraquinone derivatives substituted in the 1.4-, 1.6-, 1.7- or 1.8-positions the corresponding amino-acylamino-anthraquinones can be prepared in a similar manner.

Example 14

130 parts of 1-amino-4-chloro-anthraquinone, 800 parts of nitrobenzene and 150 parts of anthraquinone-2-carboxylic acid chloride are heated to boiling until hydrogen chloride is no longer developed. The reaction mixture is allowed to cool, 200 parts of para-toluenesulphamide, 20 parts of cupric acetate and 200 parts of sodium acetate are added, the mixture is heated for some hours at 140° to 150° C. and then for some hours to boiling. 1-para-toluenesulphamino-4-anthraquinone-β-carbamino-anthraquinone is precipitated in crystalline form. It is filtered off by suction. In order to split off the toluenesulphonic acid radicle 100 parts of the product obtained are dissolved in 100 parts of 96 per cent sulphuric acid. The solution is kept for some hours at 20° to 30° C., poured into ice-water and the precipitate is filtered off by suction, washed until neutral and dried. 1-amino-4-anthraquinone-β-carbaminoanthraquinone is thus obtained in a very good yield; it is a blue violet powder giving an orange brown vat and dissolving in concentrated sulphuric acid giving an orange coloration.

In an analogous manner 1-amino-4-(1-nitro)-anthraquinone-2-carbamino-anthraquinone is obtained by condensing 1-chloro-4-(1-nitro)-anthraquinone-2-carbamino-anthraquinone with para-toluenesulphamide and partial saponification of the condensation product; by acylating 1-chloro-4-amino-anthraquinone with 1-amino-anthraquinone-2-carboxylic acid chloride, converting the reaction product into the para-toluenesulphamino derivative and splitting off the para-toluenesulphonic acid group 1-amino-4-(1-amino)-anthraquinone-2-carbamino-anthraquinone may be obtained.

Example 15

1-amino-4-chloro-2-methylanthraquinone is acylated with para-bromobenzoylchloride in the usual manner. 1 part of the 1-(para-bromobenzoylamino)-4-chloro-2-methylanthraquinone thus obtained, 1.2 parts of para-toluenesulphamide, 1 part of calcined sodium carbonate, 0.1 part of cupric oxalate and 3 parts of nitrobenzene are heated for some hours at 140° to 150° C. and then for a short time to boiling. Then the mixture is allowed to cool and worked up in the usual manner. 10 parts of 1-(para-bromobenzoylamino)-4-para-toluenesulphamino-2-methylanthraquinone thus obtained are dissolved in 100 parts of concentrated sulphuric acid at 20° to 30° C. The solution is kept at this temperature for some hours and then worked up in the usual manner, 1-(para-bromobenzoylamino)-4-amino-2-methylanthraquinone is obtained in the form of a violet powder dissolving in concentrated sulphuric acid giving an orange coloration.

A product of similar properties is obtained by starting with 1-amino-4-chloro-2-phenylanthraquinone and working under otherwise similar conditions. 1-para-bromobenzoyl-amino-4-amino-2-anthraquinone aldehyde can be prepared in an analogous manner from 1-amino-4-chloro-2-anthraquinone aldehyde.

Example 16

1-chloro-anthraquinone-2-carboxylic acid methyl ester is nitrated whereby a nitro group enters the 5.6.7.8-ring. By reducing the nitro compound, benzoylating the amino compound thus obtained, condensing the benzoylated product with para-toluenesulphamide and partly saponifying the arylamino-sulphamino-anthraquinone carboxylic acid methyl ester an 1-amino-anthraquinone-2-carboxylic acid methyl ester containing a benzoylamino group in the other ring than the amino group is obtained.

What I claim is:

1. The process of producing amino-carboxylamino-anthraquinones which comprises acting on a sulphamino-carboxylamino-anthraquinone with sulphuric acid of from about 60 to about 98 per cent strength at between about 0° and about 90° C., whereby the sulphamino group only is saponified.

2. The process of producing amino-carboxylamino-anthraquinones which comprises acting with sulphuric acid of from about 60 to about 98 per cent strength at between about 0° and about 90° C., on a sulphamino-carboxylamino-anthraquinone corresponding to the general formula

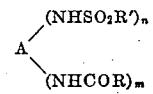

wherein A is an anthraquinone radicle, R' is an aromatic radicle, R is hydrogen or an organic radicle, n and m are whole numbers from 1 to 3 inclusive, and wherein at least one of the radicles A and R bears a substituent selected from the class consisting of the halogens, the nitro, hydroxyl, mercapto and alkoxyl, alkyl, cycloalkyl, aralkyl, aryl, acyl, cyano, thiocyano, aldehyde, carboxylic and substituted carboxylic groups, whereby the sulphamino group only is saponified.

3. The process of producing amino-carboxylamino-anthraquinones which comprises acting with sulphuric acid of from about 60 to about 98 per cent strength at between about 0° and about 90° C. on a sulphamino-carboxylamino-anthraquinone corresponding to the general formula

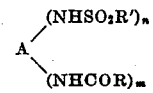

wherein A is an anthraquinone radicle, R' is an aromatic radicle, R is a polynuclear aromatic radicle and $n$ and $m$ are whole numbers from 1 to 3 inclusive, whereby the sulphamino group only is saponified.

4. Amino-carboxylamino-anthraquinones corresponding to the general formula

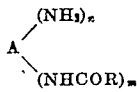

wherein A is an anthraquinone radicle, R is hydrogen or an organic radicle, $n$ and $m$ are whole numbers from 1 to 3 inclusive and wherein at least one of the radicles A and R bears a substituent selected from the class consisting of the halogens, the nitro, hydroxyl, mercapto, and alkoxyl alkyl, cycloalkyl, aralkyl, aryl, acyl, cyano, thiocyano, aldehyde, carboxylic and substituted carboxylic groups.

5. Amino-carboxylamino-anthraquinones corresponding to the general formula

wherein A is an anthraquinone radicle, R is an aromatic radicle, $n$ and $m$ are whole numbers from 1 to 3 inclusive and wherein R bears a substituent selected from the class consisting of the halogens, the nitro, hydroxyl, mercapto and alkoxyl alkyl, cycloalkyl, aralkyl, aryl, acyl, cyano, thiocyano, aldehyde, carboxylic and substituted carboxylic groups.

6. Amino-carboxylamino-anthraquinones corresponding to the general formula

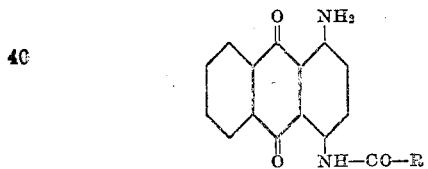

wherein R is an aromatic radicle bearing a substituent selected from the class consisting of the halogens, the nitro, hydroxyl, mercapto, and alkoxyl alkyl, cycloalkyl, aralkyl, aryl, acyl, cyano, thiocyano, aldehyde, carboxylic and substituted carboxylic groups.

7. Amino-carboxylamino-anthraquinones corresponding to the general formula

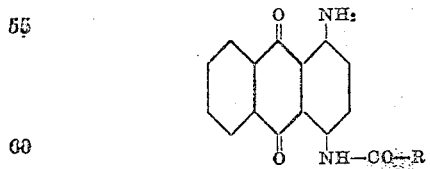

wherein R is an aromatic radicle substituted by at least one halogen atom.

8. Amino-carboxylamino-anthraquinones corresponding to the general formula

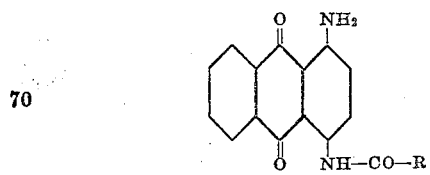

wherein R is an aromatic radicle substituted by at least one chlorine atom.

9. Amino-carboxylamino-anthraquinones corresponding to the general formula

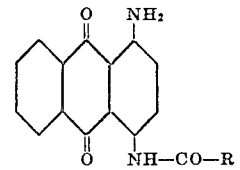

wherein R is a chlorphenyl radicle.

10. Amino-carboxylamino-anthraquinones corresponding to the general formula

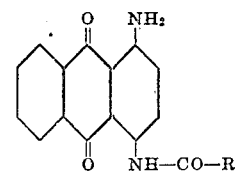

wherein R is a p-halogenphenyl radicle.

11. 1 - amino - 4 - (p-chlorbenzoyl) amino-anthraquinone.

12. Amino-carboxylamino-anthraquinones corresponding to the general formula

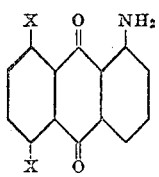

in which at least one X is —NH—CO—R, wherein R is an aromatic radicle, said products bearing a substituent selected from the class consisting of bromine, fluorine, the nitro, hydroxyl, mercapto and, alkoxyl alkyl, cycloalkyl, aralkyl, aryl, acyl, cyano, thiocyano, aldehyde, carboxylic and substituted carboxylic groups.

13. Amino-carboxylamino-anthraquinones corresponding to the general formula

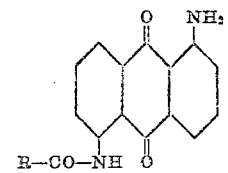

wherein R is an aromatic radicle, said products bearing a substituent selected from the class consisting of bromine, fluorine, the nitro, hydroxyl, mercapto and, alkoxyl alkyl, cycloalkyl, aralkyl, aryl, acyl, cyano, thiocyano, aldehyde, carboxylic and substituted carboxylic groups.

14. Amino-carboxylamino-anthraquinones corresponding to the general formula

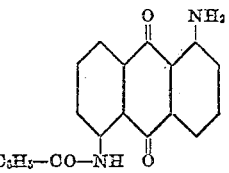

said products bearing in the anthraquinone nucleus a substituent selected from the class consisting of bromine, fluorine, the nitro, hydroxyl, mercapto and, alkoxyl alkyl, cycloalkyl, aralkyl, aryl, acyl, cyano, thiocyano, aldehyde, carboxylic and substituted carboxylic groups.

15. Amino-carboxylamino-anthraquinones corresponding to the general formula

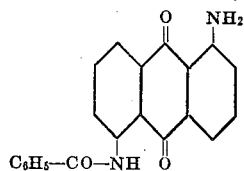

said products bearing in the anthraquinone nucleus a methoxy group.

16. 1-amino-5-benzoylamino-8-methoxy-anthraquinone.

17. Amino-carboxylamino-anthraquinones corresponding to the general formula

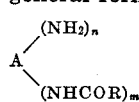

wherein A is an anthraquinone radicle, R is a polynuclear aromatic radicle, and $n$ and $m$ are whole numbers from 1 to 3 inclusive.

18. Amino-carboxylamino-anthraquinones corresponding to the general formula

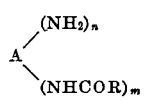

wherein A is an anthraquinone radicle, R is a polynuclear heterocyclic radicle, and $n$ and $m$ are whole numbers from 1 to 3 inclusive.

19. Amino-carboxylamino-anthraquinones corresponding to the general formula $$A\begin{matrix}(NH_2)_n\\(NHCOR)_m\end{matrix}$$

wherein A is an anthraquinone radicle, R is a polynuclear nitrogenous heterocyclic radicle, and $n$ and $m$ are whole numbers from 1 to 3 inclusive.

20. Amino-carboxylamino-anthraquinones corresponding to the general formula

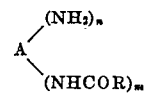

wherein A is an anthraquinone radicle, R is a quinoline radicle, and $n$ and $m$ are whole numbers from 1 to 3 inclusive.

21. Amino-carboxylamino-anthraquinones corresponding to the general formula

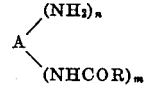

wherein A is an anthraquinone radicle, R is a quinoline radicle attached to the CO-group in the benzene nucleus, and $n$ and $m$ are whole numbers from 1 to 3 inclusive.

22. 1-amino-5-(quinoline-6'-carboxylamino)-anthraquinone.

23. Sulphamino-carboxylamino-anthraquinones corresponding to the general formula

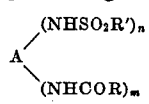

wherein A is an anthraquinone radicle, R' is an aromatic radicle, R is hydrogen or an organic radicle, $n$ and $m$ are whole numbers and wherein at least one of the radicles A and R bears a substituent selected from the class consisting of the halogens, the nitro, hydroxyl, mercapto and, alkoxyl alkyl, cycloalkyl, aralkyl, aryl, acyl, cyano, thiocyano, aldehyde, carboxylic and substituted carboxylic groups.

KARL KOEBERLE.